(12) United States Patent
Yang et al.

(10) Patent No.: US 10,820,305 B2
(45) Date of Patent: Oct. 27, 2020

(54) METHOD AND DEVICE FOR TRANSCEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Daesung Hwang, Seoul (KR); Kyuhwan Kwak, Seoul (KR); Jaehoon Chung, Seoul (KR); Kijun Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/317,511

(22) PCT Filed: Jul. 13, 2017

(86) PCT No.: PCT/KR2017/007539
§ 371 (c)(1),
(2) Date: Jan. 11, 2019

(87) PCT Pub. No.: WO2018/012910
PCT Pub. Date: Jan. 18, 2018

(65) Prior Publication Data
US 2019/0239214 A1 Aug. 1, 2019

Related U.S. Application Data

(60) Provisional application No. 62/361,515, filed on Jul. 13, 2016, provisional application No. 62/401,884, (Continued)

(51) Int. Cl.
*H04W 72/04* (2009.01)
*H04L 5/00* (2006.01)
(Continued)

(52) U.S. Cl.
CPC .......... *H04W 72/0413* (2013.01); *H04L 1/18* (2013.01); *H04L 1/1887* (2013.01); *H04L 5/00* (2013.01);
(Continued)

(58) Field of Classification Search
CPC ......... H04W 72/0413; H04W 72/1273; H04W 52/146; H04W 72/04; H04W 72/12;
(Continued)

(56) References Cited

U.S. PATENT DOCUMENTS 8,271,844 B2 * 9/2012 Terry ................... H04L 1/1816
714/751
8,284,754 B2 * 10/2012 Chang .................. H04L 5/0055
370/350

(Continued)

OTHER PUBLICATIONS

PCT International Application No. PCT/KR2017/007539, Written Opinion of the International Searching Authority dated Oct. 23, 2017, 26 pages.

*Primary Examiner* — Sharad Rampuria
(74) *Attorney, Agent, or Firm* — Lee, Hong, Degerman, Kang & Waimey

(57) ABSTRACT

The present invention relates to a wireless communication system and, particularly, to a method and a device therefor, the method comprising the steps of: configuring a plurality of A/N transmission delays and a plurality of A/N resources through a higher layer signal; receiving downlink scheduling information indicating a first A/N transmission delay among the plurality of A/N transmission delays and a first A/N resource among the plurality of A/N resources; receiving data indicated by the downlink scheduling information; and transmitting an A/N for the data by using the first A/N resource at a time determined on the basis of the first A/N transmission delay.

4 Claims, 15 Drawing Sheets

Related U.S. Application Data filed on Sep. 29, 2016, provisional application No. 62/437,039, filed on Dec. 20, 2016, provisional application No. 62/454,892, filed on Feb. 5, 2017, provisional application No. 62/475,861, filed on Mar. 23, 2017, provisional application No. 62/481,039, filed on Apr. 3, 2017, provisional application No. 62/501,050, filed on May 3, 2017.

(51) Int. Cl.
*H04L 1/18* (2006.01)
*H04W 52/14* (2009.01)
*H04W 72/12* (2009.01)

(52) U.S. Cl.
CPC ......... *H04L 5/0055* (2013.01); *H04W 52/146* (2013.01); *H04W 72/1273* (2013.01)

(58) Field of Classification Search
CPC . H04W 76/00; H04L 5/00; H04L 1/18; H04L 1/1887; H04L 5/0055; H04L 5/0023; H04L 5/001; H04L 5/0082; H04L 5/0094; H04L 1/1861; H04L 1/1854; H04L 1/1896; H04B 7/2121; H04B 7/2123; H04J 2203/0069; H04Q 2213/394
See application file for complete search history.

(56) References Cited

U.S. PATENT DOCUMENTS

| | | |
|---|---|---|
| 2011/0310856 A1 | 12/2011 | Hariharan et al. |
| 2012/0201217 A1 | 8/2012 | Malladi |
| 2014/0269541 A1* | 9/2014 | Khude ................. H04L 5/0055 370/329 |
| 2014/0348093 A1 | 11/2014 | Ihm et al. |
| 2015/0139103 A1 | 5/2015 | Yang et al. |

* cited by examiner

METHOD AND DEVICE FOR TRANSCEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2017/007539, filed on Jul. 13, 2017, which claims the benefit of U.S. Provisional Application No. 62/361,515, filed on Jul. 13, 2016, 62/401,884, filed on Sep. 29, 2016, 62/437,039, filed on Dec. 20, 2016, 62/454,892, filed on Feb. 5, 2017, 62/475,861, filed on Mar. 23, 2017, 62/481,039, filed on Apr. 3, 2017, and 62/501,050, filed on May 3, 2017, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The object of the present invention can be achieved by providing a method for transmitting a signal by a terminal in a wireless communication system, the method including configuring a plurality of acknowledgment/negative acknowledgment (A/N) transmission delays and a plurality of A/N resources through a higher layer signal, receiving downlink scheduling information indicating a first A/N transmission delay among the plurality of A/N transmission delays and a first A/N resource among the plurality of A/N resources, receiving data indicated by the downlink scheduling information, and transmitting an A/N for the data using the first A/N resource at a time determined according to the first A/N transmission delay.

In another aspect of the present invention, provided herein is a terminal used in a wireless communication system, including a radio frequency (RF) module, and a processor, wherein the processor is configured to configure a plurality of acknowledgment/negative acknowledgment (A/N) transmission delays and a plurality of A/N resources through a higher layer signal, receive downlink scheduling information indicating a first A/N transmission delay among the plurality of A/N transmission delays and a first A/N resource among the plurality of A/N resources, receive data indicated by the downlink scheduling information, and transmit an A/N for the data using the first A/N resource at a time determined according to the first A/N transmission delay.

A different plurality of A/N resources may be configured for each of the A/N transmission delays.

The first A/N transmission delay may be indicated using a field in the downlink scheduling information, and the first A/N resource may be indicated based on an index of a resource used for reception of the downlink scheduling information or the data.

The first A/N resource may be indicated using the following value:

(an index of a control channel element (CCE) used for reception of the downlink scheduling information) mod K; or (an index of a physical resource block (PRB) used for reception of the downlink scheduling information) mod K.

Herein, K is the number of the A/N resources, and A mod B denotes a remainder obtained by dividing A by B.

The first A/N transmission delay may be indicated based on an index of a resource used for reception of the downlink scheduling information or the data, and the first A/N resource may be indicated using a Transmit Power Control (TPC) field in the downlink scheduling information.

The plurality of A/N transmission delays may be independently configured for each Hybrid Automatic Repeat Request (HARQ) process ID.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
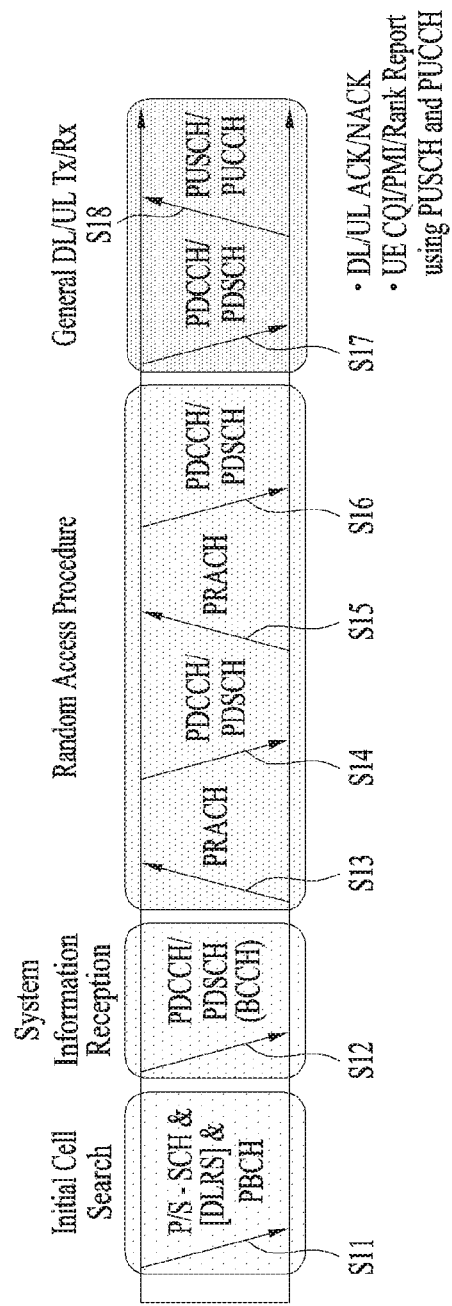
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
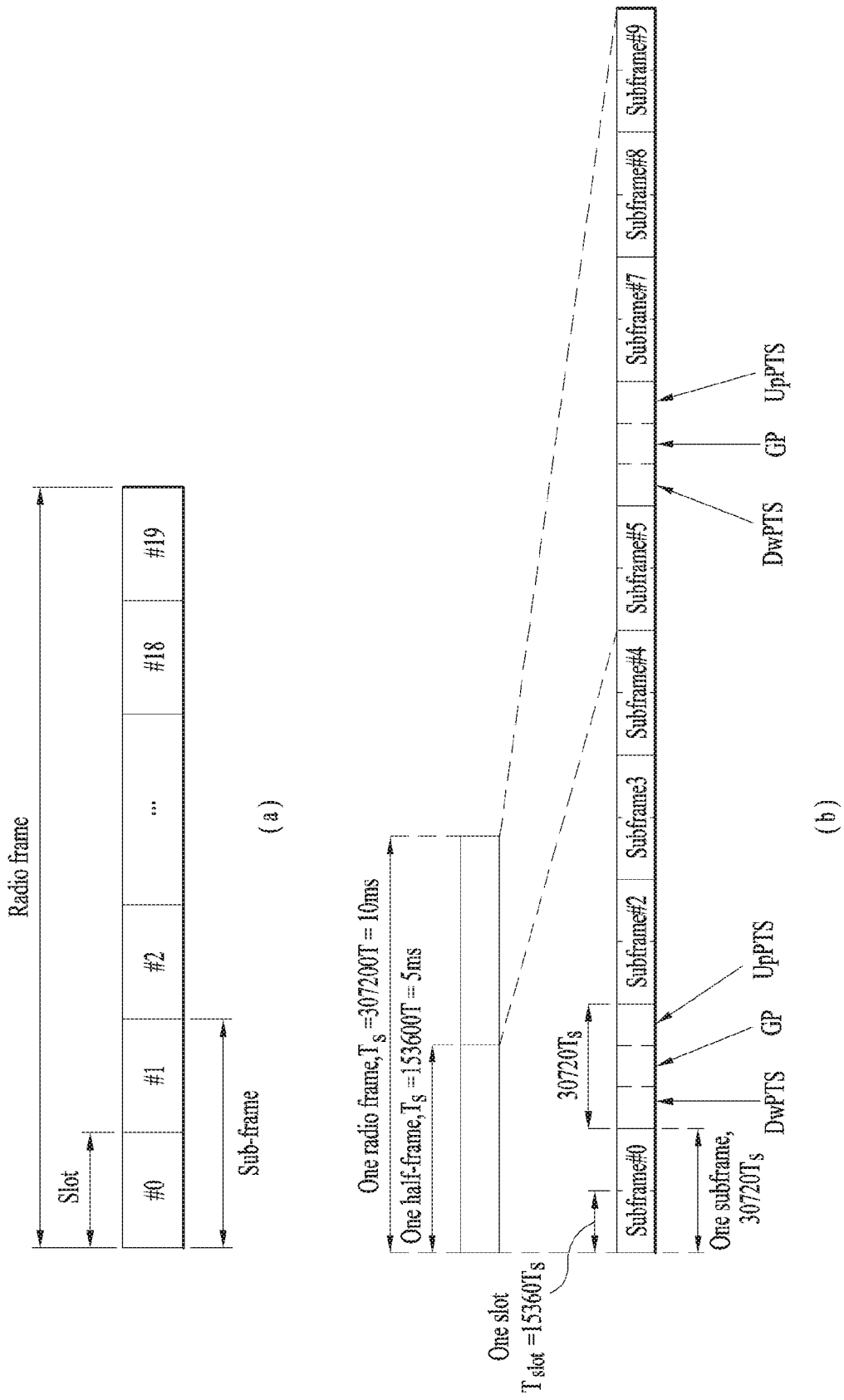
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
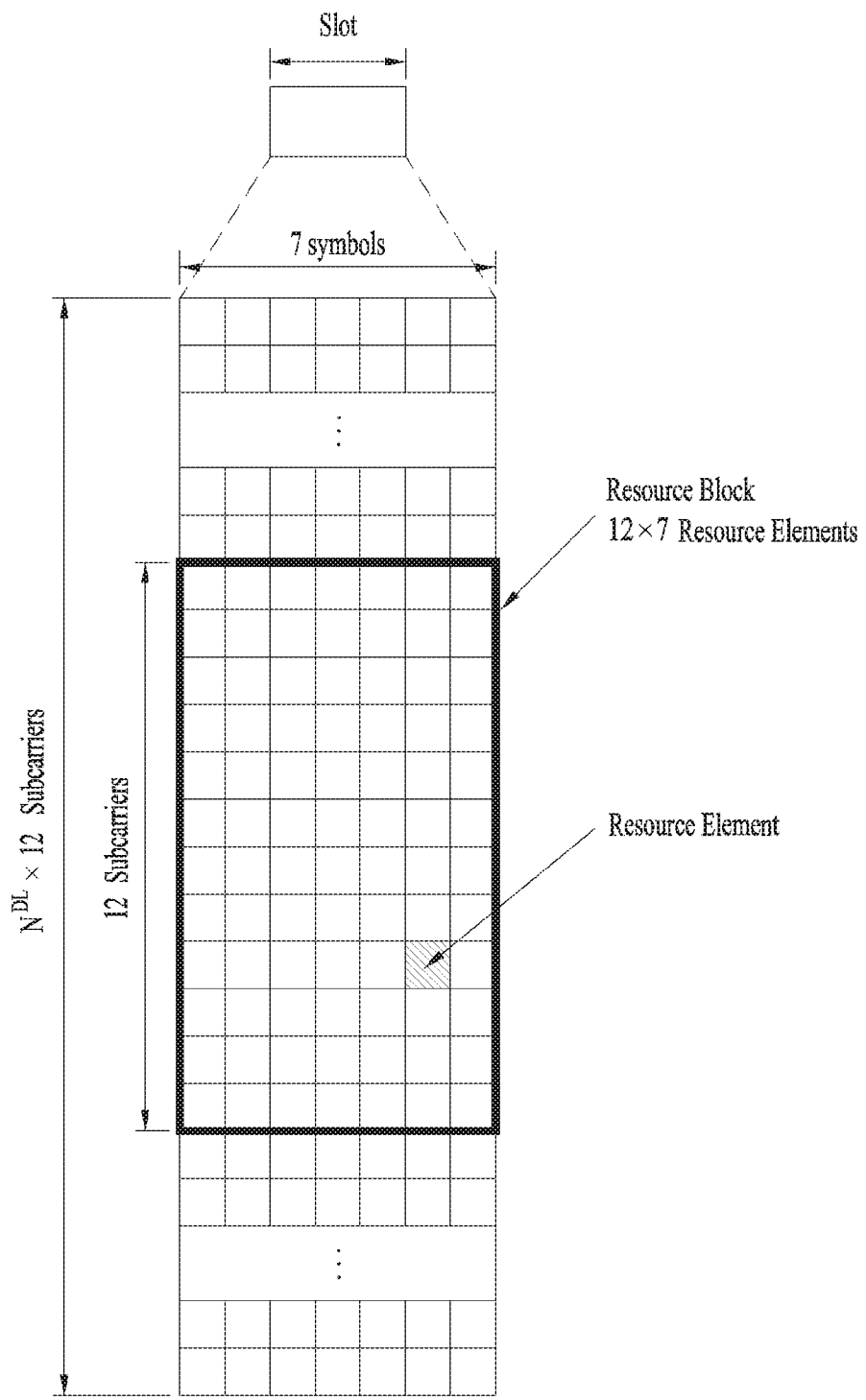
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
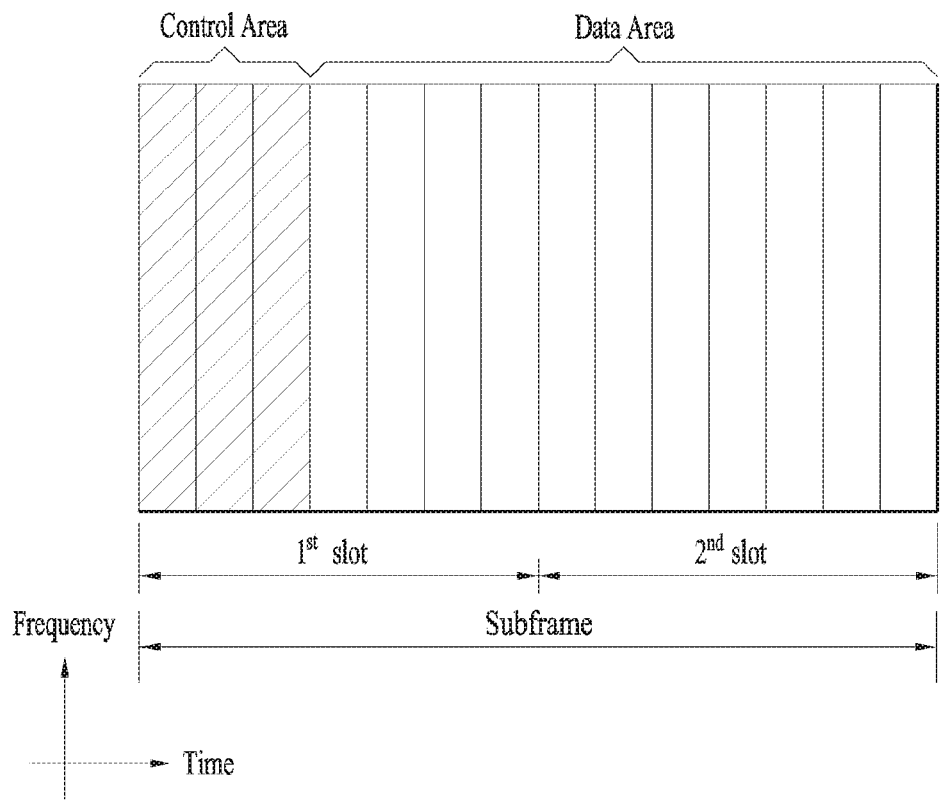
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PH-ICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e., group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
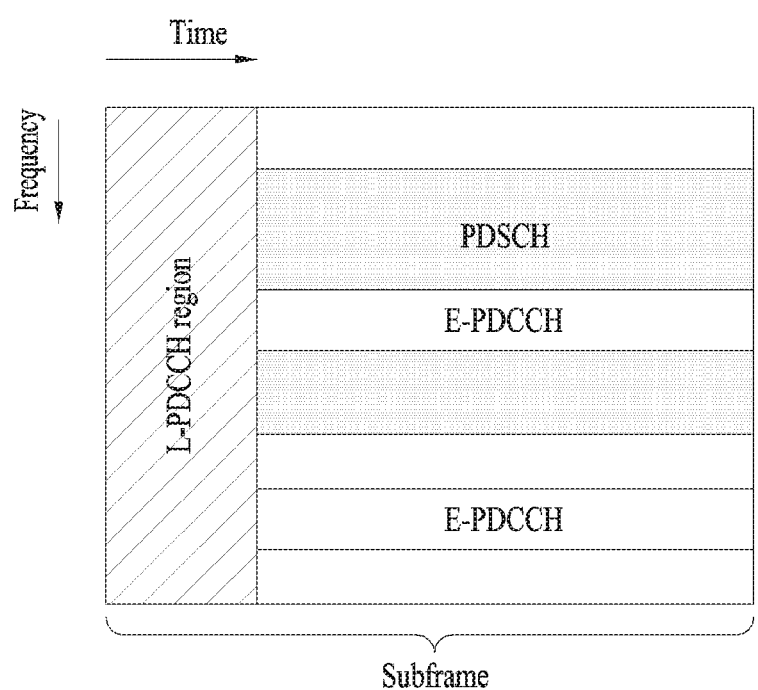
FIG. 5 illustrates an example of an Enhanced Physical Downlink Control Channel (EPDCCH).

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)
  Transmission mode 6: Closed-loop rank-1 precoding
  Transmission mode 7: Single-antenna port (port5) transmission
  Transmission mode 8: Double layer transmission (ports 7 and 8) or single-antenna port (port 7 or 8) transmission
  Transmission mode 9: Transmission through up to 8 layers (ports 7 to 14) or single-antenna port (port 7 or 8) transmission DCI Format
  Format 0: Resource grants for PUSCH transmission
  Format 1: Resource assignments for single codeword PDSCH transmission (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
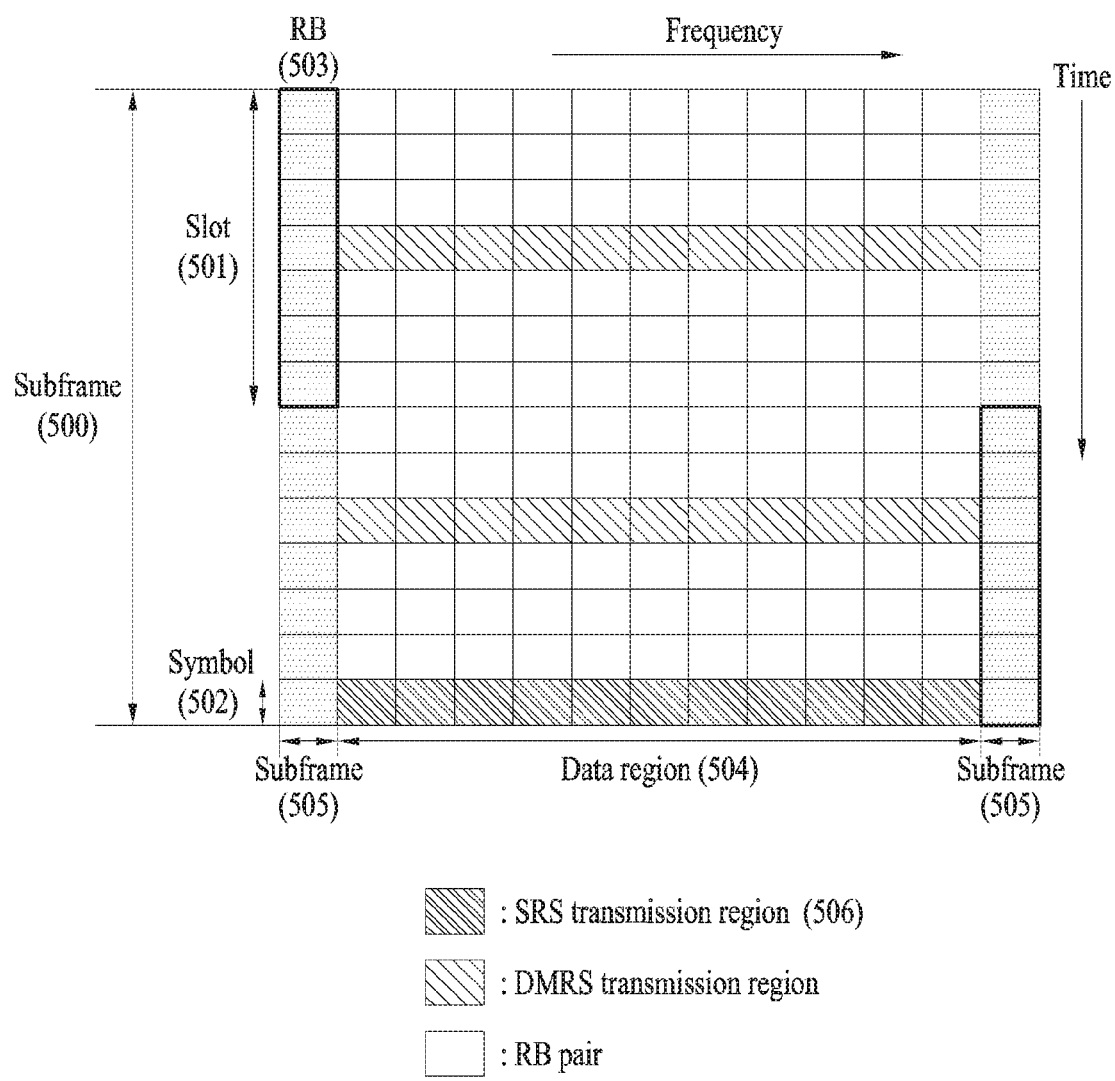
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 7:
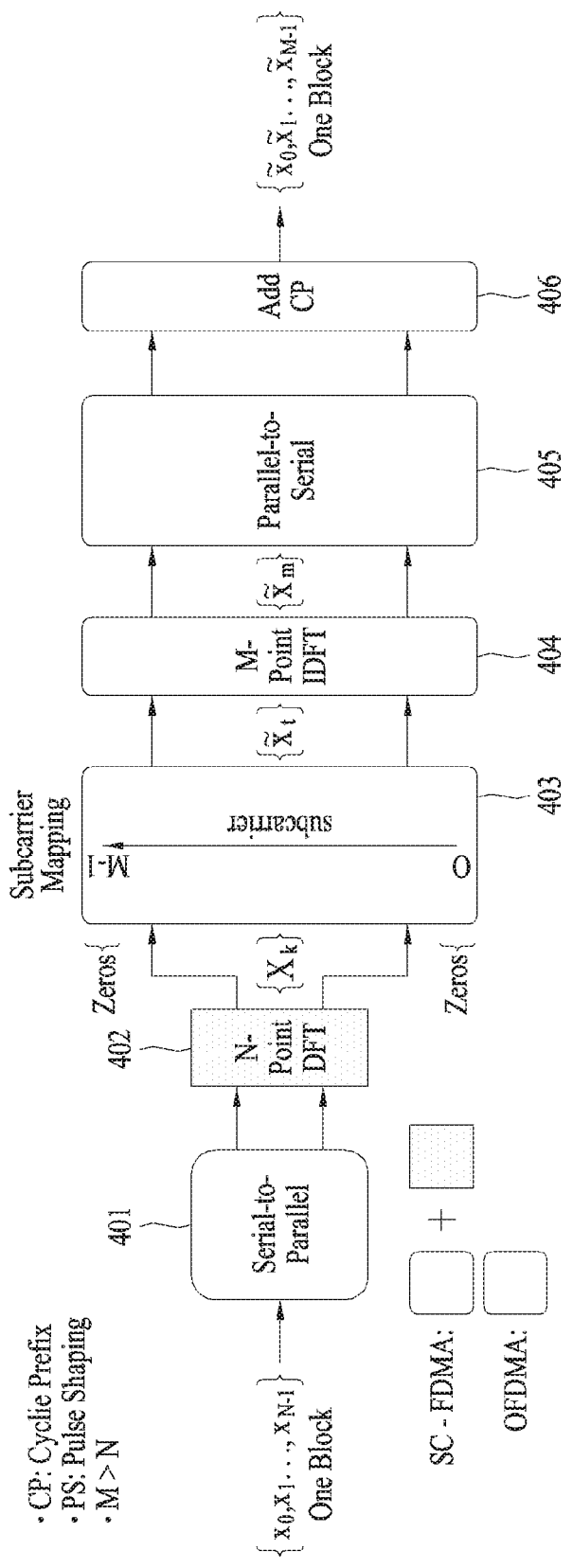
FIG. 7 illustrates Single Carrier Frequency Division Multiple Access (SC-FDMA) scheme and Orthogonal Frequency Division Multiple Access (OFDMA) scheme.

FIG. 7 illustrates SC-FDMA and OFDMA schemes. The 3GPP system employs OFDMA in downlink and uses SC-FDMA in uplink.

Referring to FIG. 7, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignement message is also referred to as a UL grant. The UEs transmit data on uplink according to the UL assignment message. The UL assignment message may include UE identity (ID), RB allocatioin information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 8:
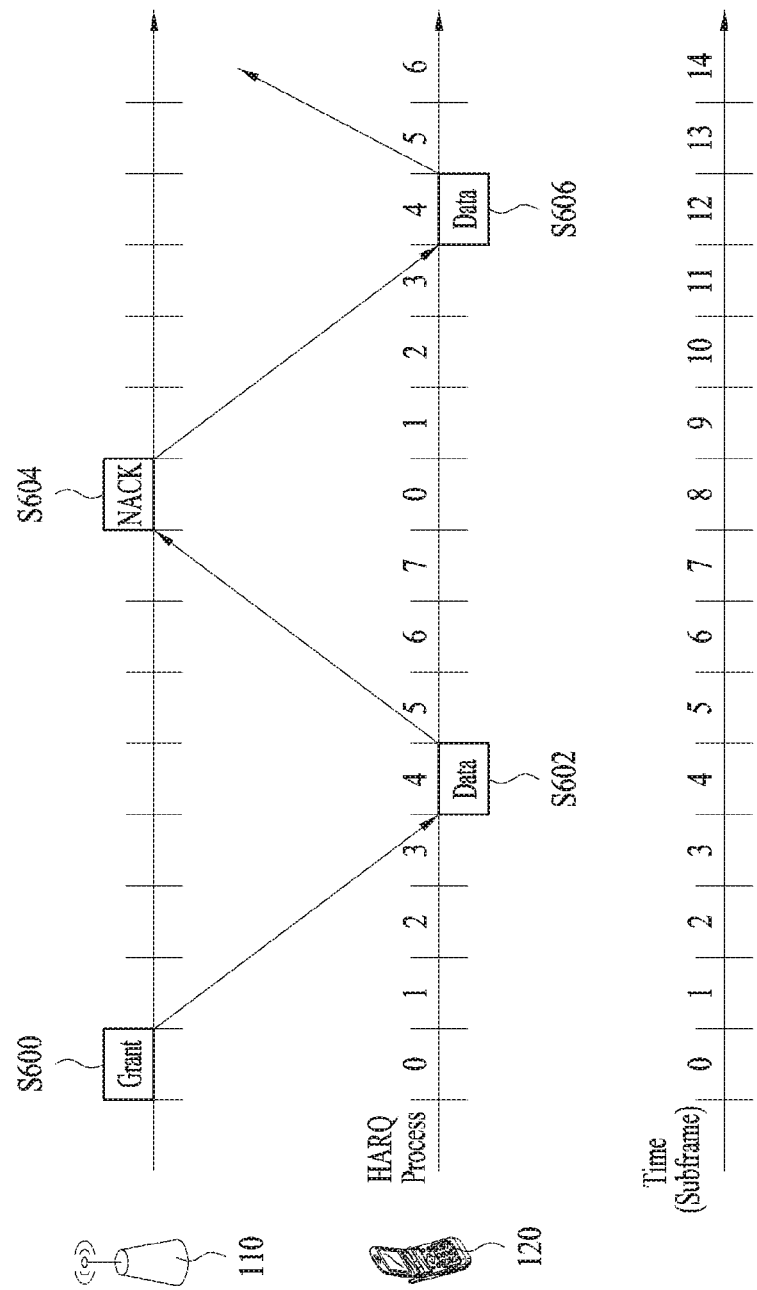
FIG. 8 illustrates UL HARQ (Uplink Hybrid Automatic Repeat Request) operation.

FIG. 8 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 8, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

In the LTE(-A) system, the DL HARQ scheme uses asynchronous adaptive HARQ. Specifically, the base station 110 transmits a DL grant to the UE 120 on the PDCCH. The UE 120 receives DL data from the base station 110 using an RB and an MCS designated by the DL grant at the time (e.g., subframe 0) at which the DL grant is received. The UE 120 decodes the DL data and then generates an ACK/NACK. When decoding of the DL data fails, the UE 120 transmits a NACK to the PlayStation 110 at a time (e.g., subframe 4) 4 subframes after the time when the UE 120 receives the DL data. Thereafter, the base station 110 transmits, to the UE 120, a DL grant for instructing retransmission of the DL data on the PDCCH at a desired time (e.g., subframe X). The UE 120 re-receives the DL data from the base station 110 using an RB and MCS designated by the DL grant at the time (e.g., subframe X) when the DL grant is received.

Figure 9:
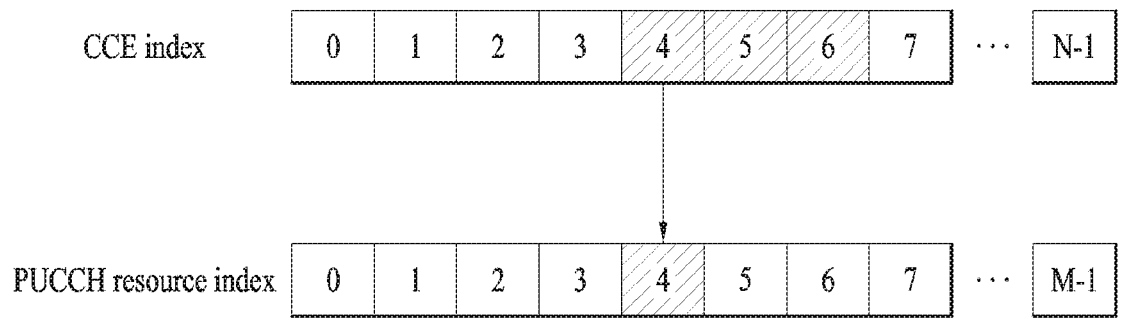
FIG. 9 illustrates an example of determining a PUCCH resource for ACK/NACK.

FIG. 9 illustrates an example of determining a PUCCH resource for ACK/NACK. In LTE system, a PUCCH resource for ACK/NACK is not allocated to each of UEs in advance. A plurality of UEs belonging to a cell use multiple PUCCH resources in a manner of sharing the resources at every timing. Specifically, when a UE uses a PUCCH resource to transmit ACK/NACK, the PUCCH resource corresponds to a PDCCH on which scheduling information on downlink data is carried. In each downlink subframe, a region in which PDCCH is transmitted is configured by a plurality of CCEs (control channel elements) and a PDCCH transmitted to a UE is configured by one or more CCEs. Having received the CCEs constructing the PDCCH, the UE transmits ACK/NACK via a PUCCH resource corresponding to a specific CCE (e.g., first CCE) among the CCEs.

Scheduling for UL transmission in LTE is enabled only if UL transmission timing of a user equipment is synchronized. A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

Figure 10:
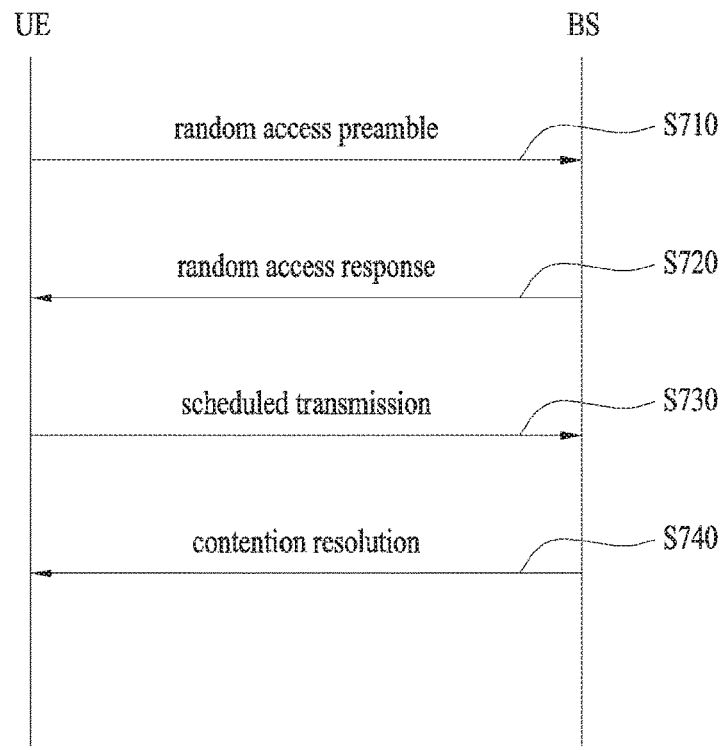
FIG. 10 and FIG. 11 illustrate examples of a random access procedure.

FIG. 10 is a diagram for one example of a contention based random access procedure.

Referring to FIG. 10, a user equipment receives information on a random access from a base station via system information. Thereafter, if the random access is required, the user equipment transmits a random access preamble (or a message 1) to the base station [S710]. Once the base station receives the random access preamble from the user equipment, the base station sends a random access response message (or, a message 2) to the user equipment [S720]. In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information [S730]. Having received the UL message from the user equipment in the step S730, the base station sends a contention resolution message (or, a message 4) to the user equipment [S740].

Figure 11:
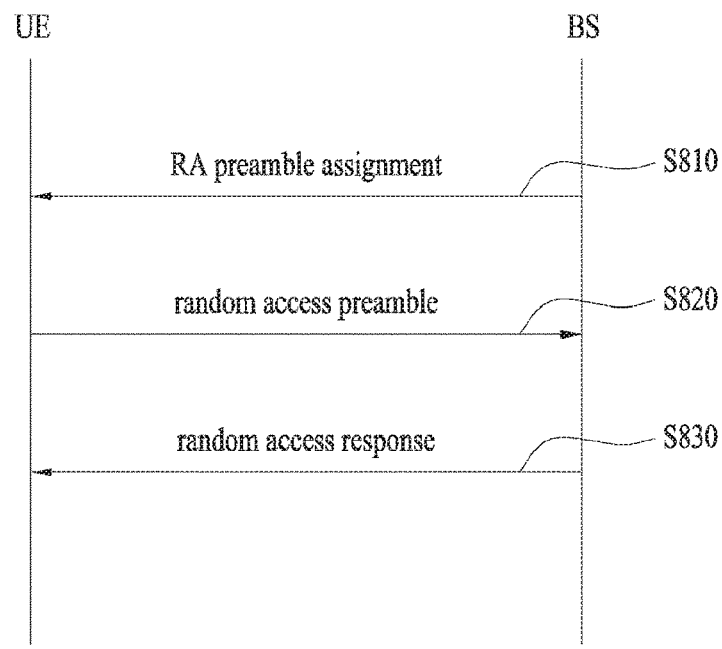

FIG. 11 is a diagram for one example of a non-contention based random access procedure. A non-contention based random access procedure may be used in a handover procedure or may exist if requested by an order given by a base station. A basic procedure is as good as a contention based random access procedure.

Referring to FIG. 11, a user equipment receives assignment of a random access preamble (i.e., a dedicated random access preamble) for the user equipment only from a base station [S810]. A dedicated random access preamble indication information (e.g., a preamble index) may be included in a handover command message or may be received on PDCCH. The user equipment transmits the dedicated random access preamble to the base station [S820]. Thereafter, the user equipment receives a random access response from the base station [S830] and the random access procedure is ended.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N_{RB}^{DL}(N_{RB}^{DL}+1)/2) \rceil$. Every bit is set to 1.

Preamble index: 6 bits

PRACH mask index: 4 bits

All the remaining bits for compact scheduling of PDSCH in DCI format 1A are set to 0.

Figure 12:
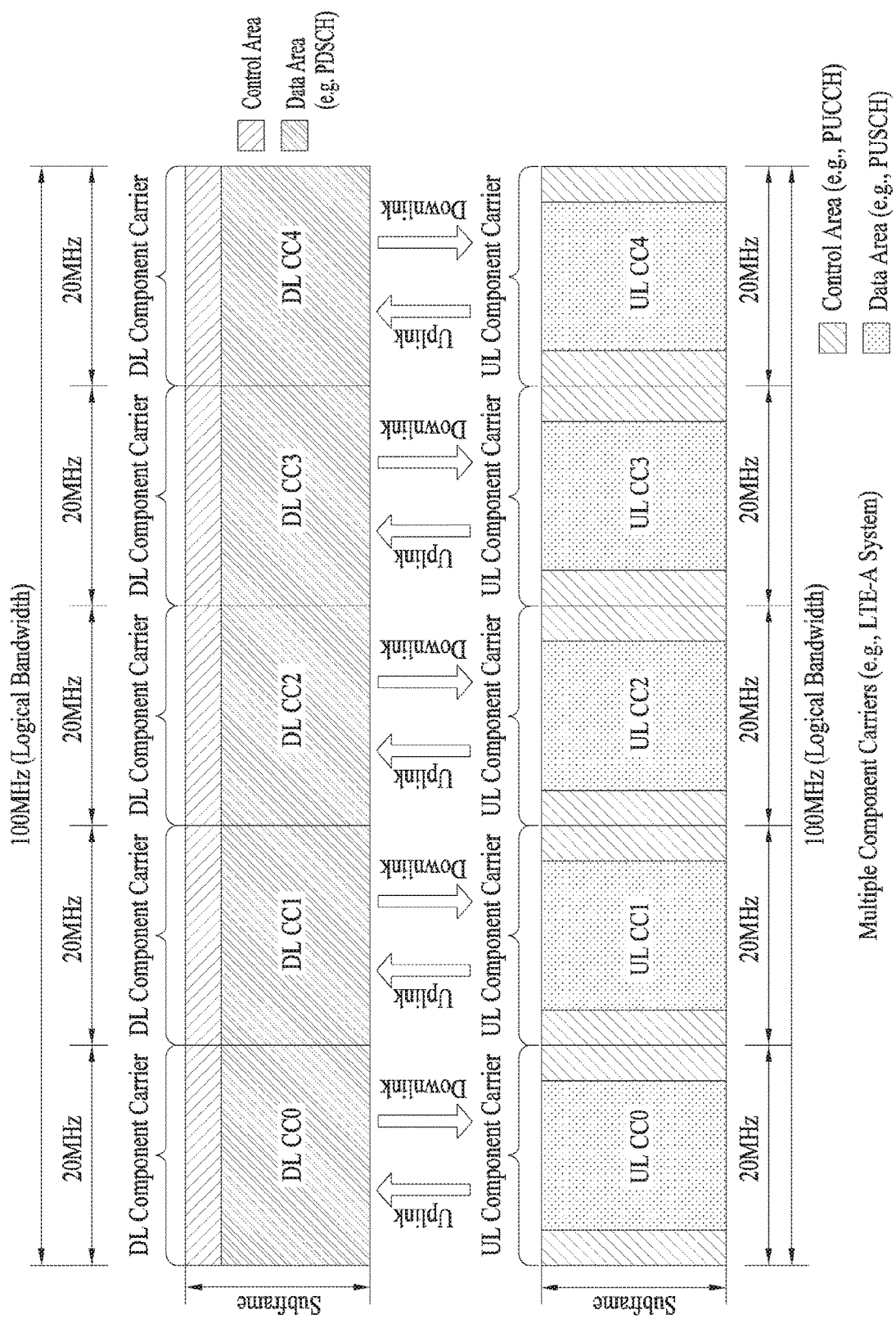
FIG. 12 illustrates a carrier aggregation (CA)-based wireless communication system.

FIG. 12 illustrates carrier aggregation (CA) communication system.

Referring to FIG. 12, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 13:
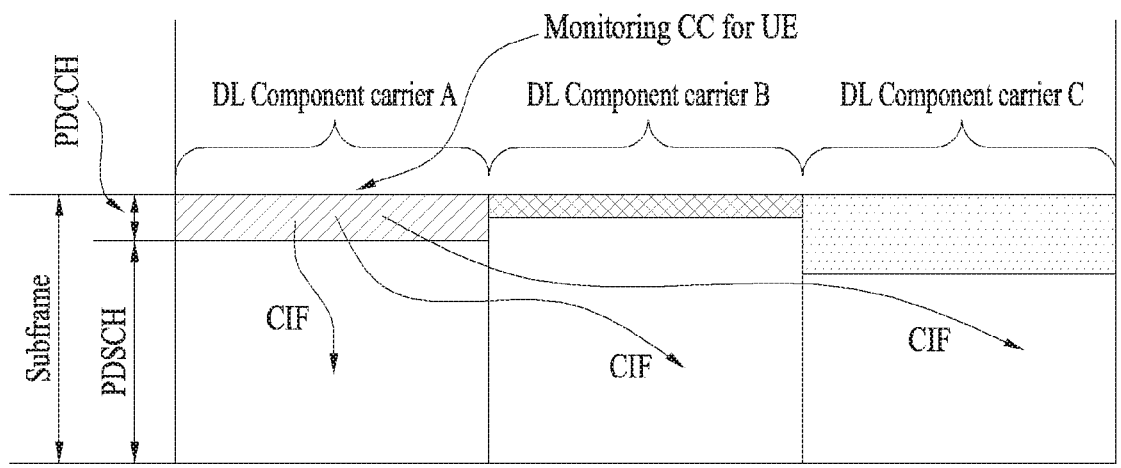
FIG. 13 illustrates cross-carrier scheduling.

FIG. 13 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm2 panel in a form of a two-dimensional array with a 0.5λ (wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

Figure 14:
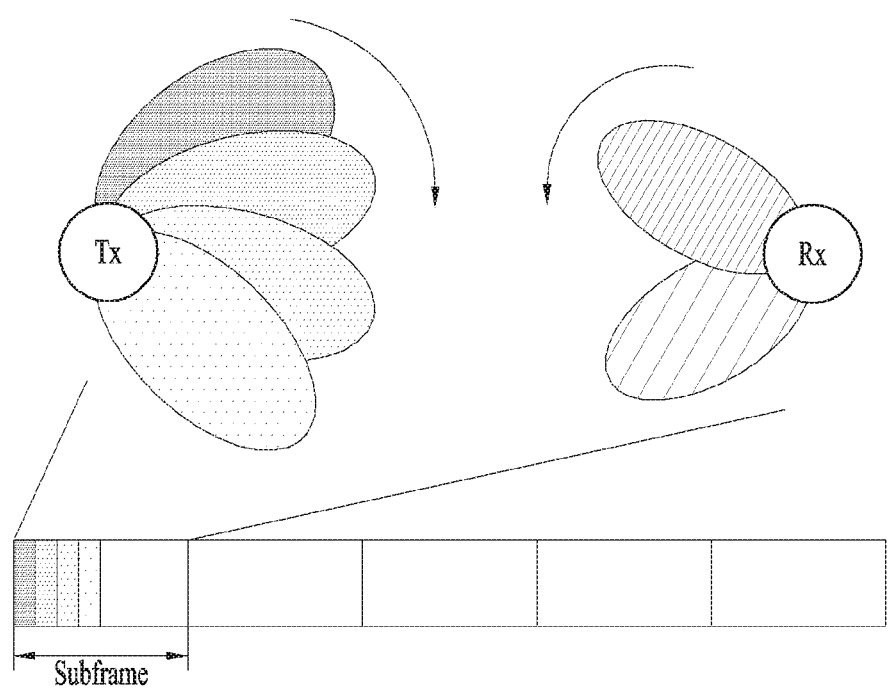
FIG. 14 illustrates analog beamforming.

FIG. 14 illustrates analog beamforming. Referring to FIG. 14, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

Figure 15:
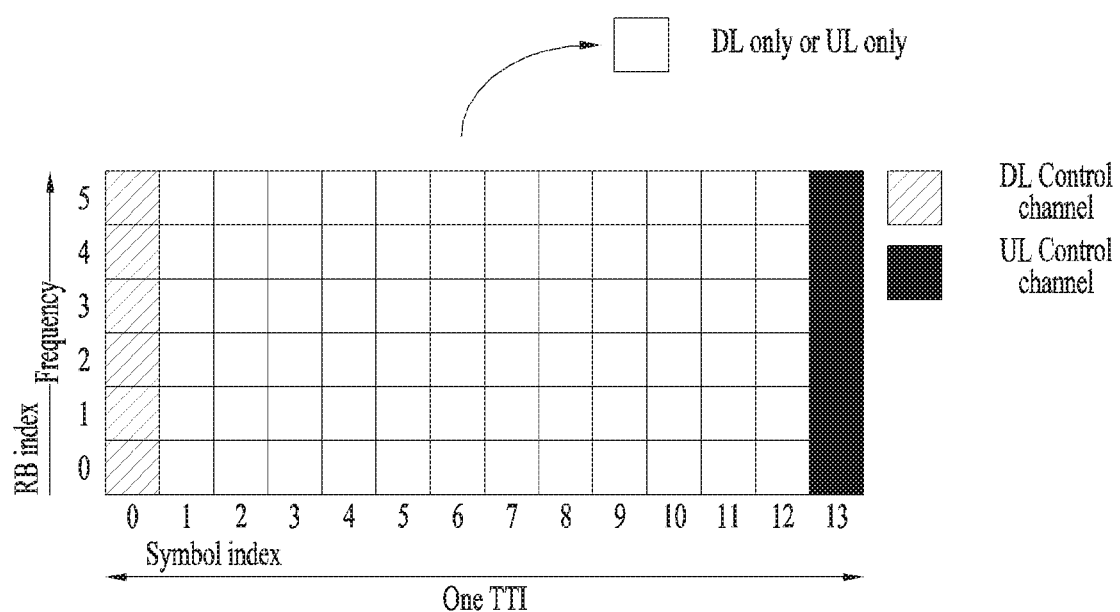
FIG. 15 illustrates a structure of a self-contained subframe.

In next-generation RAT (Radio Access Technology), a self-contained subframe is considered in order to minimize data transmission latency. FIG. 15 illustrates a self-contained subframe structure. In FIG. 15, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiments

Unlike the legacy LTE system, which operates based on a fixed DL/UL SF configuration, the New RAT (NR) system may consider a dynamic TDD operation of dynamically changing a portion (or presence) of DL/DL resources (e.g., DL/UL data channel and/or DL/UL control channel transmission symbol intervals) in a single SF or DL/UL resource portions (or locations) in a plurality of SF intervals according to the DL/UL traffic condition based on a self-contained SF type or the like.

Unlike the legacy LTE system, which applies fixed DL/UL HARQ timing (or delay), the NR system may consider a flexible HARQ operation of dynamically changing the DL/UL HARQ timing (or delay) (e.g., on a DL/UL data-by-DL/UL data basis) in consideration of a more flexible DL/UL resource configuration. Here, the DL HARQ timing may refer to, for example, a delay between DL data reception and corresponding HARQ-ACK (i.e., A/N) feedback transmission, i.e., an A/N transmission delay. The UL HARQ timing may refer to, for example, a delay between UL grant DCI reception and corresponding UL data transmission, i.e., a UL data transmission delay. In addition, in the NR system, even for the UL control channel resource for A/N transmission, a scheme of dynamically selecting/using one of multiple resource candidates (e.g., on a DL data-by-DL data basis) rather than using one fixed resource may be considered.

The present invention proposes an efficient DL HARQ operation method, considering flexible use of UL control channel resources and DCI overhead on a DL control channel. Specifically, the present invention proposes a method of effectively determining an A/N feedback transmission timing/delay and a UL control channel resource therefor according to DL data reception.

In the present invention, an SF may refer to a specific time unit (or duration) such as a slot, a TTI, or a symbol (group). In addition, in the present invention, an A/N transmission delay (simply, delay) refers to a value related to a DL grant/data-to-HARQ-ACK delay. For example, the A/N transmission delay may refer to the DL grant/data-to-HARQ-ACK delay. When the DL grant/data-to-HARQ-ACK delay is expressed as a default delay+offset, the A/N transmission delay may refer to the value of the offset.

[1] Determination of A/N Timing and A/N Resource

Method 1: First, multiple (e.g., N) candidate A/N transmission delays (simply, delays) and multiple (e.g., K) candidate A/N transmission resources (simply, resources) linked to each of the candidate A/N transmission delays may be preconfigured through a higher layer signal (e.g., RRC signaling). The K candidate resources may be configured independently for each of the candidate delays. For example, the K candidate resources may be configured identically for the N candidate delays, or may be configured differently for a part/the entirety of the delays. In this condition, one of the N candidate delays (delay indexes) (e.g., n) and one of the K candidate resources (resource indexes) (e.g., k) may be indicated through the DL grant DCI. In this case, as the A/N timing/resource for the DL data (channel) (e.g., a transport block, PDSCH) indicated by the DL grant DCI, a delay (e.g., Dn) having the n-th index among the N delays, and a resource (e.g., Rk) having the k-th index among the K resources linked to Dn are selected. As a result, the UE may apply the delay of Dn and perform A/N transmission using resource Rk. That is, when the DL grant DCI indicating one of the N candidate delays (e.g., n) and one of the K candidate resources (e.g., k) is received in SF # n, the UE may transmit the A/N for the DL data (channel) (e.g., the transport block, the PDSCH) indicated by the DL grant DCI in SF #(n+Dn) using A/N resource Rk. In addition, the A/N resources include a PUCCH resource. On the contrary, a plurality of candidate resources and a plurality of candidate delays linked to each of the candidate resources may be configured (independently), and A/N transmission may be performed by indicating/selecting a specific resource and one of the plurality of delays linked to the specific resource.

Alternatively, the entire candidate delay set may be divided into a plurality of groups, and a candidate resource set corresponding to each of the delay groups may be configured differently. Accordingly, the same candidate resource set may be configured for delays belonging to the same delay group. Delay values belonging to one group may be delay values which are consecutive in time, and A/N feedbacks corresponding to the delays belonging to the same group may be transmitted through the same A/N (PUCCH) resource. For example, when four candidate delays of candidate delays 1/2/3/4 are given as {X, X+a, X+2a, X+3a}, {X, X+a}, which represents consecutive delays 1/2 in time, may be classified into delay group 1, and {X+2a, X+3a}, which represents delays 3/4, may be classified into delay group 2. Here, X and a are positive integers. In this condition, candidate resource sets corresponding to the respective delay groups may be configured differently. For example, resources A/B/C/D may be assigned to delay group 1 and resources E/F/G/H may be assigned to delay group 2. In addition, A/N feedbacks corresponding to the delays 1/2 belonging to delay group 1 may be simultaneously transmitted through one of resources A/B/C/D, and A/N feedbacks corresponding to delays 3/4 belonging to delay group 2 may be simultaneously transmitted through one of resources E/F/G/H. For example, when A/N feedback is performed in SF # n, the A/N feedback may include A/N information for SFs #(n-X-a)/#(n-X) and be transmitted through one of resources A/B/C/D. Similarly, when A/N feedback is performed in SF # m, the A/N feedback may include A/N information for SFs #(m-X-3a)/#(m-X-2a) and be transmitted through one of resources E/F/G/H. Here, n and m may be equal to or different from each other.

Method 2 (DL): First, multiple (e.g., N) candidate A/N transmission delays and multiple (e.g., K) candidate A/N transmission resources may be preconfigured through a higher layer signal (e.g., RRC signaling). For example, delays and resources may be configured independently of each other without establishing a separate linkage therebetween, or may be configured to have a linkage therebetween based on Method 1. In this condition, one of the N candidate delays (delay indexes) may be explicitly indicated through the DL grant DCI, and one of the K candidate resources (resource indexes) may be implicitly indicated according to a DL control channel transmission resource (e.g., a CCE index) (for carrying the DL grant DCI) or a DL data channel transmission resource (e.g., a PRB index). For example, one of the K candidate resources (resource indexes) may be determined by applying a modulo-K operation to the corresponding CCE or PRB index. Here, the DL data channel indicates a DL channel scheduled/indicated by the DL grant DCI. Alternatively, one of the K candidate resources (resource indexes) may be explicitly indicated through the DL grant DCI, and one of the N candidate delays (delay indexes) may be implicitly indicated according to a DL control channel transmission resource (e.g., a CCE index) or a DL data channel transmission resource (e.g., a PRB index). For example, one of the N candidate delays (delay indexes) may be determined by applying a modulo-N operation to the CCE or PRB index. When there are multiple CCE/PRB indexes, the first CCE/PRB index may be used to determine a resource or delay.

Method 2 (UL): An implicit indication scheme similar to Method 2 (DL) may be applied to UL HARQ timing (i.e., UL data (UD) transmission delay). Specifically, when multiple (e.g., N) candidate UD transmission delays are preconfigured, one of the N candidate delays (delay indexes) may be implicitly determined according to a DL control channel transmission resource (e.g., a CCE index) (for carrying the UL grant DCI) or a resource (e.g., a PRB index) scheduled/assigned for UL data transmission (e.g., by applying a modulo-N operation to the CCE or PRB index). When there are multiple corresponding CCE/PRB indexes, the first CCE/PRB index may be used to determine the resource or delay.

Method 3: First, similar to Method 2, multiple (e.g., N) candidate A/N delays and multiple (e.g., K) candidate A/N resources may be preconfigured through a higher layer signal (e.g., RRC signaling). In this condition, when a specific A/N delay (index) (of the N candidate delays) is indicated through DL grant DCI, a TPC command for transmit power control for a UL control channel (carrying A/N) may be signaled through the DL grant DCI without signaling of an A/N resource indicator (ARI). On the other hand, when the other A/N delays (delay indexes) are indicated, an ARI (indicating one of the K candidate resources) may be signaled through the DCI (without signaling of a TPC command). In this case, the specific A/N delay (delay index) may be set to an index with the largest or smallest time delay (of the N candidate delays). In addition, the ARI and TPC may be selectively signaled through the TPC field in the DCI. When only the DCI including the TPC is received without receiving the ARI, the UE may operate to transmit only the A/N for the corresponding DL data reception, using a UL control channel implicitly linked to the corresponding DCI transmission resource (e.g., a (lowest) CCE index) or the corresponding DL data transmission resource (e.g., a (first) PRB index). For example, the UL control channel resource (resource index) may be determined by applying a modulo-T operation to the corresponding CCE or PRB index. Here, T is the number of UL control channel resources (resource indexes). On the other hand, when any DCI including the ARI is received, the UE may transmit the A/N for DL data reception that corresponds to all candidate delays (e.g., N candidate delays), using an A/N resource indicated by the ARI. For example, when A/N feedback is performed in SF # n, the A/N feedback may include A/N information for SFs #(n-$D_{N-1}$)/#(n-$D_{N-2}$)/ . . . /#(n-$D_0$). {$D_0$, . . . , $D_{N-2}$, $D_{N-1}$} denotes N candidate delays (where $D_0 < \ldots < D_{N-2} < D_{N-1}$).

In the present invention, a plurality of candidate A/N transmission delays may be configured differently according to a transport block (TB) size of the DL data. As an example, a larger delay value (set) may be set for a larger TB size. Accordingly, the UE may operate, considering the A/N delay value signaled through the DL grant DCI to indicate one of the delay values set for the TB size of the DL data scheduled from the DCI.

For DL/UL data transmission scheduled based on a common search space, and/or a UE-common RNTI, and/or a specific DCI format (e.g., a DCI format commonly configured for all transmission modes) for the DL control channel, the operation may be performed by applying a single fixed HARQ timing (e.g., DL grant/data-to-HARQ-ACK delay, UL grant-to-UL data delay) (e.g., 4 SFs or ms) that is predefined (or configured through a system information block (SIB)).

In addition, for a UD delay applied to UL data channel (e.g., RACH Msg3) transmission scheduled through the random access response (RAR) (or scheduled for UE identification) in an (initial) random access procedure and an A/N delay applied to DL data channel (e.g., RACH Msg4) transmission scheduled for contention resolution (in the case of Msg3 transmission conflict between multiple UEs), a fixed default HARQ delay value that is predefined (or configured through a system information block (SIB)) may be applied. The default HARQ delay value may be applied to any UL/DL data transmission until separate configuration (configuration through a higher layer signal (e.g., RRC signaling) and/or UE-specific configuration) is performed for another HARQ delay value.

Method 4: multiple (e.g., N) combinations of a candidate A/N delay and a candidate A/N resource, i.e., delay-resource pairs, may be preconfigured through a higher layer signal (e.g., RRC signaling). For example, N delay-resource pairs including pair 1 of {delay value 1, resource index 1}, pair 2 of {delay value 2, resource index 2, . . . , pair N of {delay value N, resource index N} may be configured. The delay value and resource index may differ among different pairs or may be set to the same values for some or all pairs. In this condition, one pair (of the N delay-resource pairs) may be indicated through the DL grant DCI, and the UE may apply/use the delay and resource configured in the pair to perform A/N transmission.

Method 5: A plurality of candidate A/N delays and a plurality of candidate A/N resources are preconfigured, a part (e.g., a field) indicating the A/N delay in the DL grant DCI is defined as an A/N delay indicator (ADI), and a part (e.g., a field) indicating the A/N resource in the DL grant DCI is defined as an ARI. In addition, an implicit UL control channel resource linked to a resource (e.g., a (lowest) CCE index) used for DL grant DCI transmission or a DL data transmission resource (e.g., a (first) PRB index) corresponding to the DCI is defined as an implicit A/N resource. For example, the UL control channel resource (resource index) may be determined by applying a modulo-T operation to the CCE or PRB index. Here, T is the total number of UL control channel resources (resource indexes). In this condition, when a specific delay value is indicated through the ADI, the ARI may be configured to indicate i-1) an implicit A/N resource or another implicit A/N resource determined by applying a specific resource index offset thereto, or i-2) one of an implicit A/N resource and a specific explicit A/N resource (preconfigured through a higher layer signal (e.g., RRC signaling)). In case i-1), use of the implicit A/N resource may be indicated regardless of the ARI values. In case i-2), one of the ARI values (e.g., 00 when the ARI value is in 2 bits) may indicate use of the implicit A/N resource, and the other ARI values may indicate an explicit A/N resource. On the other hand, when the other delay values are indicated through the ADI, ii) the ARI may be configured to indicate one of a plurality of explicit A/N resources. That is, all the ARI values may indicate only explicit A/N resources. Thus, depending on the delay value indicated by the ADI, the ARI value may be construed as case i-1) and i-2) or ii).

Method 6: First, an A/N delay and/or an A/N resource to be applied/assigned for each HARQ process ID related to DL data may be configured independently (e.g., differently). Accordingly, the UE may operate to apply/use the A/N delay and/or A/N resource configured in the HARQ process ID assigned to the DL data to perform A/N transmission for the DL data. Alternatively, a linkage for each HARQ process ID may be configured for only one of the A/N delay and the A/N resource, and the other one may be directly indicated through the DL grant DCI. Similarly, UD delays applied/assigned for each UL data-related HARQ process ID may be configured independently (e.g., differently). Accordingly, the UE may operate to transmit the UL data by applying the UD delay configured in the HARQ process ID assigned to the UL data.

The proposed methods of the present invention (e.g., Methods 1/2/3/4/5/6) may be applied to other UCI (e.g., CSI feedback or SR signaling) transmission and SRS transmission in the same manner. For example, in Methods 1/2/3/4/5/6, the A/N transmission delay may be replaced with a CSI/SR/SRS transmission delay, the A/N transmission resource may be replaced with a CSI/SR/SRS transmission resource, and the DL grant DCI may be replaced with DCI for triggering CSI/SR/SRS transmission.

Method 7: A candidate A/N resource set may be configured independently (e.g., differently) according to the size (e.g., the number of RBs, the number of symbols or a combination of the numbers of RBs/symbols) of a region in which a PUCCH resource is reserved/configured in a single SF (or slot). The candidate A/N resource set may be configured through a higher layer signal (e.g., RRC signaling). Specifically, the UE may perform A/N transmission using a resource indicated by the ARI in an A/N resource set configured for the PUCCH resource region size in the A/N transmission SF among a plurality of candidate A/N resource sets configured for each PUCCH resource region size. The UE may determine the size (and presence or absence) of the PUCCH resource region configured in each SF by detecting a specific signal (UE-common signal) (of an SF format indicator (SFI)). The SFI may be transmitted from the base station, in a manner of including DL/UL (data/control) resource configuration information in each SF (including PUCCH resource region information).

Method 8: Depending on the DL/UL resource configuration in the SF indicated by the SFI, the UE may differently perform a reception operation (e.g., receiving or skipping the reception) of a specific DL signal scheduled/configured in the SF and a transmission operation (e.g., transmitting or skipping the transmission) of a specific UL signal scheduled/configured in the SF. For example, when it is indicated (through the SFI) that there is no DL (control) resource region in the SF, the UE may skip blind decoding (BD) of the DCI in the SF. When it is indicated (through the SFI) that the DL control resource region consists of N symbols, the UE may distribute the maximum number of BDs (which may be performed within a single SF) to the N symbols according to a specific rule to perform BD on a symbol-by-symbol basis. In this case, the number of BDs allocated per symbol may be differently determined according to N, which is the number of symbols constituting the DL control resource region (indicated through the SFI). As another example, when it is indicated (through the SFI) that a specific DL RS (e.g., CSI-RS) resource region or DL (data) resource region is not present in the SF, the UE may skip reception of a specific DL RS (e.g., a CSI-RS) from the base station scheduled/configured in the SF. As still another example, where it is indicated (through the SFI) that there is no UL (control) resource region in the SF, the UE may skip UCI transmission scheduled/configured for the SF. As yet another example, when it is indicated (through the SFI) that a specific UL RS (e.g., SRS) resource region or UL (data or control) resource region is not present in the SF, the UE may skip transmission of a specific UL RS (e.g., SRS) scheduled/configured in the SF.

Method 9: For a plurality of candidate A/N (PUCCH) resources configured through a higher layer signal (e.g., RRC signaling) in a situation of analog (or hybrid) beamforming transmission-based multi-beam operation, TX beam information of the UE (e.g., a transmission beam (or port) index or ID of the UE) used for PUCCH transmission may be configured independently (e.g., differently) for each candidate PUCCH resource. As an example, M different UE TX beams may be configured for the same PUCCH resource index (i.e., physical resource) to configure M different candidate PUCCH resources. Conversely, the same UE TX beam may be configured for L different PUCCH resource indexes to configure L different candidate PUCCH resources. According to this configuration, one of the multiple candidate PUCCH resources having different UE TX beams or one of the different candidate PUCCH resources having the same UE TX beam may be indicated through the ARI, and the UE may perform A/N transmission using the indicated PUCCH resource and the UE TX beam configured therefor.

Alternatively, L candidate PUCCH resources may be configured independently for each of the M UE TX beams. When a specific TX beam used for PUCCH transmission is indicated through DCI (e.g., a DL grant), one of the L candidate PUCCH resources configured for the TX beam may be indicated through the ARI. Conversely, M UE TX beams may be configured independently for each of the L candidate PUCCH resources. When a specific PUCCH resource is indicated through the ARI of the DCI (e.g., the DL grant), one of the M TX beams configured for the PUCCH resource may be indicated through the DCI.

Method 10: The (candidate) A/N timing (e.g., the SF/slot location or the symbol location in the SF/slot), the (candidate) A/N resources, and/or the minimum number of bits to be stored in a soft buffer per TB (hereinafter, minimum storing bits) for DL data scheduled from corresponding DCI may be configured differently for each DCI format. In addition, the (candidate) A/N timing, the (candidate) A/N resources, and/or the minimum storing bits for DL data corresponding to each HARQ process ID may be configured differently for each ID. Additionally, the candidate A/N timing, and/or candidate A/N resources and/or minimum storing bits for DL data may be configured differently according to the last symbol location allocated to DL data transmission, the (last) DMRS symbol location for DL data reception, and/or the DL data signal mapping scheme (e.g., frequency-first mapping or time-first mapping).

In addition, the (candidate) transmission timing (e.g., the SF/slot location or the symbol location in the SF/slot) for UL data scheduled from DCI corresponding to each DCI format may be configured differently for each DCI format. Additionally, the (candidate) transmission timing for UL data corresponding to each HARQ process ID may be configured differently for each ID. Further, the (candidate) transmission timing may be configured differently according to the initial symbol location allocated to UL data transmission, the DMRS symbol location for the UL data transmission, and/or the UL data signal mapping scheme (e.g., frequency-first mapping or time-first mapping).

Method 11: A rule may be defined such that a plurality of ARI values in DL grant DCI which indicate the same symbol index in a specific slot as the A/N transmission timing should indicate the same A/N PUCCH resource (e.g., the same PRB index, the same cyclic shift value, and the same OCC index for a PUCCH). ARI values in the DL grant DCI that indicate different symbol indexes in the same slot as the A/N transmission timing may indicate different A/N PUCCH resources (e.g., at least one of the PRB index, the cyclic shift value, and the OCC index constituting the PUCCH differs among the ARI values).

In the proposed method, the A/N timing may be replaced with HARQ timing (e.g., a time delay between a DL grant reception time and a corresponding DL data reception time, a time delay between a UL grant reception time and a corresponding UL data transmission time) or UCI timing (e.g., a time delay between a specific DCI reception time and a transmission time of UCI (e.g., CSI, SR, SRS) triggered therefrom). In addition, in this method, the A/N resource may be replaced with a PUCCH resource or SRS resource used for UCI (e.g., CSI, SR) transmission.

Figure 16:
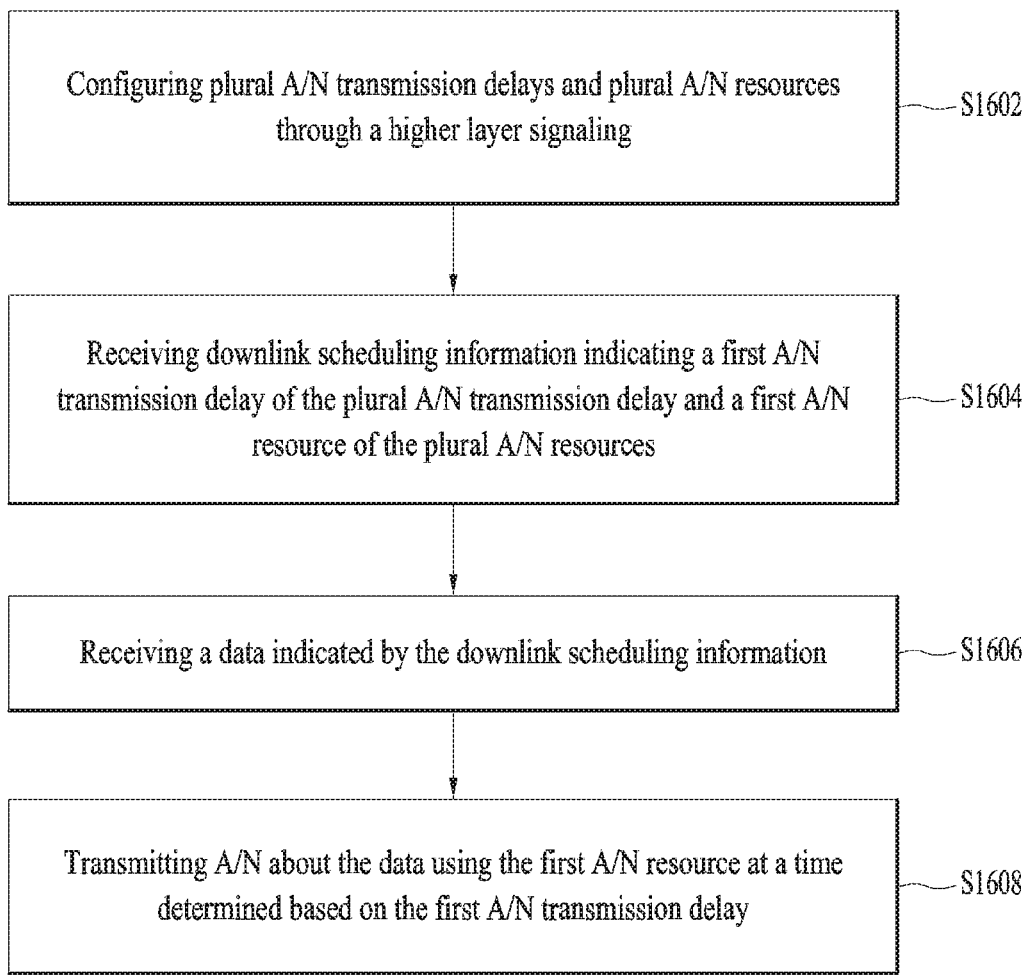
FIGS. 16 to 17 illustrate signal transmission according to the present invention.

FIG. 16 illustrates a signal transmission procedure according to the present invention. Referring to FIG. 16, the UE may configure a plurality of A/N transmission delays and a plurality of A/N resources through a higher layer signal (S1602). Thereafter, the UE may receive DL scheduling information indicating a first A/N transmission delay among the plurality of A/N transmission delays and a first A/N resource among the plurality of A/N resources (S1604), and receive data indicated by the DL scheduling information (S1606). Thereafter, the UE may transmit an A/N for the data using the first A/N resource at a time determined according to the first A/N transmission delay (S1608).

Here, a different plurality of A/N resources may be configured for each A/N transmission delay. In addition, the first A/N transmission delay may be indicated using a field in the DL scheduling information, and the first A/N resource may be indicated based on the index of a resource used for reception of the DL scheduling information or data. As an example, the first A/N resource may be indicated using the following value:

(the index of a control channel element (CCE) used for reception of the DL scheduling information) mod K; or
(the index of a physical resource block (PRB) used for reception of the DL scheduling information) mod K, Here, K is the number of the A/N resources, and A mod B represents a remainder obtained by dividing A by B.

The first A/N transmission delay may be indicated based on the index of a resource used for reception of the DL scheduling information or data, and the first A/N resource may be indicated using a TPC field in the DL scheduling information.

In addition, multiple A/Ns may be independently configured for each transmission delay HARQ (Hybrid Automatic Repeat Request) process ID.

[2] Switching Between Delayed A/N and Aggregated A/N

First, an aggregated A/N transmission timing and period, and one or more candidate A/N transmission delays (for use in simultaneous transmission of a plurality of A/Ns for the DL data reception in a plurality of SFs) may be preconfigured through a higher layer signal (e.g., RRC signaling). In this condition, whether to transmit the A/N through the aggregated A/N timing or to transmit the A/N by applying one candidate A/N delay indicated among the candidate A/N delays (in a manner similar to the scheme in section [1]) may be indicated through DL grant DCI. When the aggregated A/N timing is indicated, an operation may be performed to transmit an A/N for the DL data reception using the earliest/nearest aggregated A/N timing after a specific time delay (e.g., the minimum DL data-to-A/N transmission delay that the UE may support) from the DCI reception time or the corresponding DL data reception time. When the aggregated A/N transmission scheme and/or the indicated-delay A/N transmission scheme (including the scheme of section [1] above) are applied, the same ARI value (e.g., A/N resource index) may be indicated in the multiple DL grant DCIs indicating the same A/N timing (e.g., A/N transmission time/SF).

A UL control channel (e.g., PUCCH) format and/or a resource (used for A/N transmission) indicated through the DL grant DCI (the ARI value in the DL grant DCI) may be configured differently according to whether the aggregated A/N is indicated or the indicated-delay A/N is indicated through the DL grant DCI. For example, when one or more resources for PUCCH format X and one or more resources for PUCCH format Y are preconfigured and the aggregated A/N is indicated through the DL grant DCI, one of the resources of PUCCH format X may be indicated by the DL grant DCI (the ARI in the DL grant DCI). On the other hand, when the indicated-delay A/N is indicated through the DL grant DCI, one of the resources of PUCCH format Y may be indicated by the DL grant DCI (the ARI in the DL grant DCI). In this case, the maximum UCI payload that may be transmitted in PUCCH format X may be configured/defined to be larger than PUCCH format Y.

Figure 17:
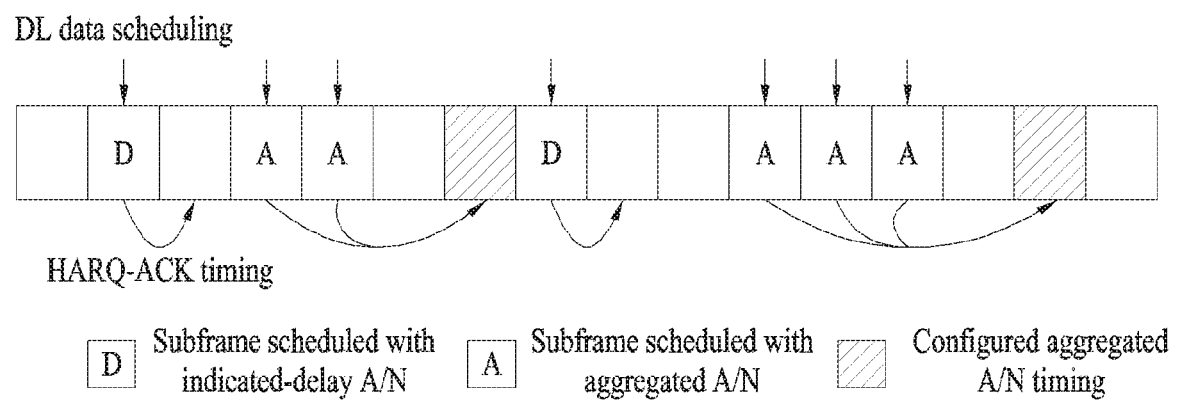

FIG. 17 illustrates an aggregated A/N and an indicated-delay A/N.

Referring to FIG. 17, the A/N payload size (or the number of A/N bits) to be transmitted through a time configured as an aggregated A/N timing may be set to correspond to the number of SFs within the interval (or period) between aggregated A/N timings. For example, when the interval/period between aggregated A/N timings is set to N SFs, the A/N payload may be composed of A/Ns for DL data receptions in the N SFs. When there is no DL data reception in an SF, the A/N for data reception in the SF is processed as NACK or DTX. The A/N payload size (or the number of A/N bits) to be transmitted through each A/N timing in the indicated-delay A/N scheme including the scheme of section [1] may be set to correspond to the number of candidate A/N delays. For example, when K candidate A/N delays are configured, the A/N payload may be composed of A/Ns corresponding to K SFs.

Additionally, when the aggregated A/N scheme and the indicated-delay A/N scheme are combined/selectively applied, an aggregated A/N payload (corresponding to the number of SFs) corresponding to the interval/period between aggregated A/N timings may be configured/transmitted through a time (e.g., a A/N transmission time/SF) configured as the aggregated A/N timing, and an A/N payload (corresponding to the number of SFs) corresponding to the number of candidate A/N delays may be configured/transmitted through the other A/N timings (e.g., A/N transmission times/SFs).

[3] A/N Fallback for Single SF Scheduling

Multiple A/N feedbacks may be configured based on the indicated-delay A/N scheme and/or the aggregated A/N scheme and be transmitted through a UL control channel format (i.e., a large UC format) that provides a relatively large A/N payload. In this situation, when there is only an A/N for DL data reception in a specific single SF, a method of A/N fallback to transmit only the single A/N through a UL control channel format providing a relatively small A/N payload (hereinafter referred to as a small UC format) may be considered.

As a first method of A/N fallback, when some of a plurality of (preconfigured) candidate A/N resources are configured as small UC format resources, the other resources are configured as large UC format resources, and only DL grant DCI indicating a small UC format resource as an A/N resource (for one A/N timing) is received, the UE may transmit only the A/N for the corresponding DL data reception through the small UC format resource. On the other hand, when any DL grant DCI indicating a large UC format resource as an A/N resource is received, the UE may operate to transmit multiple A/N feedbacks through a large UC format resource. As a second method, when only the DL grant DCI indicating a specific A/N delay (for one A/N timing) among a plurality of (preconfigured) candidate A/N delays is received, the UE may transmit only an A/N for the corresponding DL data reception through a small UC format resource. On the other hand, when any DL grant DCI indicating the other A/N delays is received, the UE may operate to transmit multiple A/N feedbacks through a large UC format resource. The specific A/N delay may be set to the largest or smallest time delay (of the multiple candidate delays). The small UC format resource may be explicitly configured through a higher layer signal (e.g., RRC signaling) or may be determined according to an implicit link to a DCI or DL data transmission resource. For example, the small UC format resource (resource index) may be determined by applying a modulo-S operation to a corresponding DCI transmission resource (e.g., a (lowest) CCE index) or a corresponding DL data transmission resource (e.g., a (first) PRB index). Here, S is the number of small UC format resources (resource indexes). As a third method, when only DL grant DCI including TPC is received without ARI reception (with respect to one A/N timing), the UE may operate to transmit only the A/N corresponding to the DL data reception through a small UC format resource. When the UE receives DL grant DCI indicating an ARI, the UE may operate to configure multiple A/N feedbacks and transmit the A/N feedbacks through a large UC format resource. The small UC format resource may be explicitly configured through a higher layer signal (e.g., RRC signaling) or may be determined according to an implicit link to the DCI or DL data transmission resource.

An A/N transmission delay for DL data reception transmitted based on the SPS scheme may be Opt 1) designated through DCI indicating DL SPS activation or Opt 2) preconfigured through a higher layer signal (e.g., RRC signaling) or predefined as a specific fixed value. In the case of Opt 1, the A/N transmission delay indicated through the DL SPS activation DCI may be applied to the SPS based DL data transmission until DL SPS release DCI is detected/received. The A/N transmission delay for reception of the DL SPS release DCI may be directly indicated through the DL SPS release DCI. In the case of Opt 2, a preconfigured/predefined A/N transmission delay may be applied not only to the SPS-based DL data transmission but also to the DL SPS release DCI reception. The first UL (or DL) data transmission timing transmitted in the SPS scheme (e.g., the first data transmission timing after receiving the SPS activation DCI) may also designated through the UL (or DL) SPS activation DCI or be preconfigured through a higher layer signal (e.g., RRC) or predefined to be a specific fixed value.

The A/N transmission delay for the SPS-based DL data may be set to one fixed value semi-statically (or during a specific time interval, for example, a time interval from the SPS activation time to the SPS release time). On the other hand, an A/N transmission delay for DL data based on general scheduling rather than on the SPS scheme may be dynamically changed/indicated among a plurality of different candidate values. For simplicity, the A/N delay for the SPS-based DL data is defined as dS, the number of candidate A/N delays for the scheduling-based DL data is defined as K, and the respective candidate values are defined as {d1, d2, . . . , dK}. In this situation, the A/N payload (size) transmitted through SF # n that is not set as the A/N transmission timing for the SPS-based DL data may be comprised of A/Ns for K DL data receptions in {SF #(n−d1), SF #(n−d2), . . . , SF #(n−dK)}, considering only the A/N for the scheduling-based DL data. When dS is set to be equal to one of {d1, d2, . . . , dK}, the A/N payload (size) transmitted through SF # n configured as the A/N transmission timing for the SPS-based DL data may also be comprised of A/Ns for K DL data receptions in {SF #(n−d1), SF #(n−d2), . . . , SF #(n−dK)}. On the other hand, when dS is not set to be equal to any one of {d1, d2, . . . , dK}, the A/N payload (size) transmitted through SF # n configured as the A/N transmission timing for the SPS-based DL data may be comprised of A/Ns for (K+1) DL data receptions in {SF #(n−dS), SF #(n−d1), SF #(n−d2), . . . , SF #(n−dK)}, in consideration of all A/Ns for the two DL data types. In order to avoid increasing the A/N payload size, a restriction may be applied such that dS is set to be equal to one of {d1, d2, . . . , dK} (or one of {d1, d2, . . . , dK} is set to be equal to dS).

An A/N transmission delay for specific scheduling (e.g., UE (group) CSS-based DCI transmission)-based DL data may also be semi-statically set to/defined as one fixed value. For simplicity, an A/N delay for specific scheduling (referred to as CSS for simplicity)-based DL data is defined as dC, the number of candidate A/N delays for general scheduling-based DL data is defined as K, and the respective candidate values are defined as {d1, d2, . . . , dK}. In this situation, when dC is set to be equal to one of {d1, d2, . . . , dK}, the A/N payload (size) transmitted through SF # n may be comprised of A/Ns for K DL data received through {SF #(n−d1), SF #(n−d2), . . . , SF #(n−dK)}. On the other hand, when dC is not set to be equal to any one of {d1, d2, . . . , dK}, the A/N payload (size) transmitted through SF # n may be comprised of A/Ns for (K+1) DL data received through {SF #(n−dC), SF #(n−d1), SF #(n−d2), . . . , SF #(n−dK)}, in consideration of all A/Ns for the two DL data types. In order to avoid increasing the A/N payload size, a restriction may be applied such that dC is set to be equal to one of {d1, d2, . . . , dK} (or one of {d1, d2, . . . , dK} is set to be equal to dC).

Meanwhile, the NR system takes into consideration both a cyclic prefix (CP)-OFDM type waveform and a DFT-s-OFDM waveform as waveforms for UL channel/signal (e.g., data) transmission. In this case, it may be necessary to define a default waveform to be used until a specific waveform type for Case 1) Msg3 transmission (scheduled from the RAR) involved in the random access procedure, Case 2) UL data transmission based on specific scheduling (e.g., DCI transmitted through the CSS), Case 3) UL transmission from the base station. The default waveform may be predefined (as, for example, the DFT-s-OFDM type) in the standard document or configured through the system information or RAR, and the UE may apply the default waveform to UL channel/signal (e.g., data) transmission in Case 1/2/3.

In the NR system environment, applying the SPS scheme even to UCI signal transmissions such as CSI feedback, SR transmission, and SRS transmission may be taken into consideration. Specifically, the UCI transmission period may be preconfigured through a higher layer signal (e.g., RRC signaling), and the UE may operate to periodically perform UCI transmission from the time the UE receives an activation signal (e.g., DCI) and to stop UCI transmission when the UE receives a release signal (e.g., DCI). For flexibility of such temporary periodic UCI transmission, a scheme may be considered in which a plurality of different UCI transmission periods is preconfigured through a higher layer signal (e.g., RRC signaling), and one of the plurality of periods is indicated through the activation signal (e.g., DCI). In this scheme, the UE may perform UCI transmission according to the indicated period. The indication method for the SPS transmission period may not be limited to the UCI transmission, but may be applied even to SPS-based DL/UL data transmission.

[4] A/N Resource Reservation for Multiple DL Data SFs

Considering the indicated-delay A/N scheme and/or the aggregated A/N scheme including the sachem of section [1], an implicit A/N resource linked to a DL grant DCI transmission resource (e.g., a (lowest) CCE index) or a DL data transmission resource (e.g., a (first) PRB index) in one or more (e.g., N) SFs may be reserved in one or more (e.g., K) symbols (in a single SF). For simplicity, the (maximum) number of DCI or DL data transmission resources, i.e., DL resources (resource indexes), that may be configured in a single SF is defined as Dc (where index=0, 1, . . . , DcC−1), and the (maximum) number of A/N resources (resource indexes) that may be configured in a single symbol is defined as Uc (where index=0, 1, . . . , Uc−1). Here, when DCI transmission resources in a single SF is configured in an interval of a plurality of symbols, a DCI transmission resource configured in a symbol having a lower index (e.g., an earlier symbol in temporal order) may have a lower index among the DL resources. In addition, when N SFs are given, it is assumed that the N SFs have indexes of 0, 1, . . . , N−1 in temporal order (i.e., SF index 0 comes first in temporal order and have the largest time delay with respect to the A/N transmission SF). When K symbols are given, it is assumed that the K symbols have indexes of 0, . . . , K−1 in temporal order (i.e., symbol index 0 comes first in temporal order). For simplicity, DL resource index Y at SF index X is referred to as DL(X)_(Y), and A/N resource index B at symbol index A (in the A/N transmission SF) is referred to as UL(A)_(B).

The DL resources may be sequentially arranged from the lowest index thereof according to the order in which the (linked) A/N resources are reserved in the A/N transmission SF as shown below. Here, the total number of DL resources, Nd, may be set such that Nd=N Dc, and thus the entire DL resource indexes d may be determined as d=0, 1, . . . , Nd−1.

DL resource index 0=DL(N−1)_(0)
DL resource index 1=DL(N−1)_(1)
. . .
DL resource index (Dc−1)=DL(N−1)_(Dc−1)
DL resource index Dc=DL(N−2)_(0)
DL resource index (Dc+1)=DL(N−2)_(1)
. . .
DL resource index (Nd−1)=DL(0)_(Dc−1)

The A/N resources configured in the A/N transmission SF sequentially arranged from the lowest index thereof according to the order according to the order in which the A/N resources are reserved as shown below. Here, the total number of A/N resources, Nu, may be set to Nu=K×Uc, and thus the entire A/N resource indexes u may be determined as u=0, 1, . . . , Nu−1.

A/N resource index 0=UL(K−1)_(0)
    A/N resource index 1=UL(K−1)_(1)
    . . .
    A/N resource index (Uc−1)=UL(K−1)_(Uc−1)
    A/N resource index Uc=UL(K−2)_(0)
    A/N resource index (Uc+1)=UL(K−2)_(1)
    . . .
    A/N resource index (Nu−1)=UL (0)_(Uc−1)

In this condition, the A/N resource index u linked to the DL resource index d may be set using {d modulo Nu}. For example, the A/N resource index u may be set to {d modulo Nu}+offset. Here, {A modulo B} denotes the remainder obtained when A is divided by B.

[5] Determination of DL Data Timing and A/N Timing

In the following description, a time interval between the reception timing of DL scheduling grant DCI (a DL control channel carrying the same) and the reception timing of the DL data (channel) scheduled from the DCI is defined as a DL data (hereinafter, DD) reception delay.

Method A: Multiple (e.g., N) candidate DD reception delays and multiple (e.g., K) candidate A/N transmission delays linked to the (candidate) DD reception delays, respectively, may be preconfigured through a higher layer signal (e.g., RRC signaling). In this case, multiple candidate A/N transmission delays may be configured independently (for example, identically or partially/fully differently) for the respective DD reception delays. In this condition, one of the N DD reception delays (delay indexes) (e.g., n) and one of the K A/N transmission delays (delay indexes) (e.g., k) may be indicated through the DL grant DCI. In this case, a delay (e.g., D_Dn) having the n-th index among the N DD reception delays and a delay (e.g., A_Dk) having the k-th index among the K A/N transmission delays linked to D_Dn are selected. As a result, the UE may operate to perform DL data reception and A/N transmission by applying a delay of D_Dn between DL grant DCI reception and DL data reception and applying a delay of A_Dk delay between DL data reception and A/N transmission. In contrast, multiple candidate A/N transmission delays and multiple candidate DD reception delays linked to the A/N transmission delays, respectively, may be configured (independently), and the UE may operate to perform DL data reception and A/N transmission by indicating/applying a specific one A/N transmission delay and a specific one of multiple DD reception delays linked to the A/N transmission delay.

Method B: multiple (e.g., N) combinations of a candidate DD reception delay and a candidate A/N transmission delay, i.e., DD-A/N delay pairs, may be configured through a higher layer signal (e.g., RRC signaling). For example, N DD-A/N delay pairs may be configured in a manner in which {DD delay value 1, A/N delay value 1} is configured as pair 1, {DD delay value 2, A/N delay value 2} is configured as pair 2, . . . , and {DD delay value N, A/N delay value N} is configured as pair N. The DD delay value and the A/N delay value may be set to differ among different pairs or set to the set to the same values for some pairs. In this condition, a specific pair (among the N DD-A/N delay pairs) may be indicated through DL grant DCI, and the UE may apply/use the DD delay and A/N delay set in the pair to perform DL data reception and A/N transmissions.

Method C: a DD reception delay and/or an A/N transmission delay to be applied to each DL data-related HARQ process ID may be configured independently (e.g., differently). Accordingly, the UE may operate to perform DL data reception and/or corresponding A/N transmission by applying the DD reception delay and/or the A/N transmission delay configured for the HARQ process ID allocated to the DL data. Alternatively, only one of the DD delay and the A/N delay may have linkage configured for each HARQ process ID, and the other one may be directly indicated by the DL grant DCI.

Method D: Regarding the DL data scheduling/transmission operation, only one delay value of the DD reception delay may be configured through a higher layer signal (e.g., RRC signaling) so as to be fixedly applied, while multiple candidate delay values of the A/N transmission delay may be preconfigured through a higher layer signal (e.g., RRC signaling) and one of the preconfigured values may be dynamically indicated through the DL grant DCI. In contrast, only one delay value of the A/N transmission delay may be configured through a higher layer signal (e.g., RRC signaling) so as to be fixedly applied, while multiple candidate delay values of the DD reception delay may be preconfigured through a higher layer signal (e.g., RRC signaling) and one of the preconfigured values may be dynamically indicated through the DL grant DCI.

Method E: It is basically assumed that DCI for scheduling one DL data transmission is divided into multiple (e.g., two) partial DCIs (e.g., first DCI and second DCI) and then transmitted. The first DCI may be transmitted through the DL control channel resource region and the second DCI may be transmitted through the DL data channel (or DL control channel) resource region. In this situation, for the DL data transmission, the DD reception delay information may be indicated through the first DCI, and the A/N transmission delay information may be indicated through the second DCI. Alternatively, for the DL data transmission, the DD reception delay information may be indicated through the first DCI, and the A/N transmission delay and the A/N PUCCH resource information may be indicated through the second DCI. Alternatively, for the DL data transmission, the DD reception delay and the A/N transmission delay information may be indicated through the first DCI, and the A/N PUCCH resource information may be indicated through the second DCI. Alternatively, for the DL data transmission, the DD reception delay information and the A/N PUCCH resource information may be indicated through the first DCI, and the A/N transmission delay information may be indicated through the second DCI.

Method F: Depending on the last symbol position to which a DL data signal corresponding to DL data is mapped in a slot in which the DL data is transmitted, an A/N delay for A/N transmission corresponding to the DL data, for example, slot and symbol positions (position candidate set) in which the A/N transmission will start may be configured differently. As an example, an A/N delay corresponding to the last DL data symbol having a higher index may be set to a greater value. Alternatively, the last symbol position (candidate set) to which a DL data signal is mapped may be configured differently according to the corresponding A/N transmission delay value. In addition, depending on the first symbol position to which a DL data signal corresponding to DL data is mapped in a slot in which the DL data is transmitted, a UD delay for the UL data transmission corresponding to a UL grant, for example, a slot position (candidate set) in which the UL data transmission will start may be configured differently. As an example, a UD delay corresponding to the first DL data symbol having a lower index may be set to a greater value. Alternatively, the first symbol position (candidate set) to which a DL data signal is mapped may be configured differently according to the corresponding UD transmission delay value.

Depending on the last symbol position to which an A/N (PUCCH) signal is mapped in a slot, the position of the earliest slot in which the corresponding DL data retransmission grant DCI can be detected may be configured differently. As an example, for the last A/N symbol having a lower index, the position of the corresponding slot may be set to an earlier time. In addition, Depending on the last symbol position to which a UL data signal is mapped in a slot, the position of the earliest slot in which the corresponding UL data retransmission grant DCI can be detected may be configured differently. As an example, for the last UL data symbol having a lower index, the position of the corresponding slot may be set to an earlier time Method G: DL HARQ timing types may be considered: a semi-static timing type of applying one fixed HARQ timing configured through a higher layer signal (e.g., RRC signaling) and a dynamic timing type of configuring multiple candidate HARQ timings through RRC and indicating one of the configured timings through DCI. In addition, two HARQ-ACK resource types may be considered: a semi-static resource type of using one fixed PUCCH resource configured through a higher layer signal (e.g., RRC signaling) and a dynamic resource type of configuring multiple candidate PUCCH resources through RRC and indicating one of the configured resources through the DCI. In this condition, dynamic resources may be configured for both semi-static timing-based DL data transmission and dynamic timing-based DL data transmission. In this case, one candidate HARQ resource set may be commonly configured for semi-static timing-based DL data and dynamic timing-based DL data, or independent (e.g., different) candidate HARQ resource sets may be configured for the semi-static timing-based DL data and the dynamic timing-based DL data, respectively. Alternatively, dynamic HARQ timing may be configured for both semi-static resource-based DL data transmission and dynamic resource-based DL data transmission. In this case, one candidate HARQ timing set may be commonly configured for the two DL data types, or independent (e.g., different) candidate HARQ timing sets may be set for the DL data types, respectively.

Method H: The DD transmission delay (candidate set) and/or the DL data start symbol position (candidate set) may be configured differently according to a beam index indicated for DL data reception. As an example, when a beam index different from a DL grant reception beam index is indicated for DL data reception, a greater DD transmission delay value and/or a higher DL data start symbol index may be set than when a beam index identical to the DL grant reception beam index is set. In addition, the UD transmission delay (candidate set) and/or the UL data start symbol position (candidate set) may be configured differently according to the beam index indicated for UL data transmission, and/or the A/N transmission delay (candidate set) and/or the PUCCH transmission symbol position (candidate set) may be configured differently according to the beam index indicated for PUCCH transmission.

Method I: In the case of the 2-step DCI-based scheduling scheme based on the combination of the first DCI and the second DCI of Method E, scheduling information updated at relatively long intervals of period may be transmitted through the first DCI, and scheduling information updated at relatively short intervals of period (for example, in every slot) may be transmitted through the second DCI. In this scheme, whether or not the first DCI contents are updated may be indicated through the second DCI. In this case, 1) it may be indicated that the first DCI contents have been updated, through detection of the second DCI in a situation where detection of the first DCI is failed, or 2) when there is a mismatch between the contents detected from the first DCI and presence or absence of update of the first DCI contents detected from the second DCI, the UE may operate to discard all detected DCIs.

Method J: In the NR system, when multiple BW parts may be configured within a single carrier (system BW), one UE may change the operational frequency to different BW parts through frequency tuning to perform the signal transmission/reception operation. Accordingly, the DD transmission delay (candidate set) and/or the DL data start symbol position (candidate set) may be configured differently according to a BW part index indicated for DL data reception. For example, when DL data reception is indicated through a BW part index different from the BW part index at which the DL grant is received, a greater DD transmission delay value and/or a higher DL data start symbol index may be set than when BW part index identical to the DL grant reception BW part index is indicated. In addition, the UD transmission delay (candidate set) and/or the UL data start symbol position (candidate set) may be configured differently according to the BW part index indicated for UL data transmission (for example, when UL data transmission is indicated through a BW part index different from the BW part index at which a UL grant is received, a greater UD transmission delay value and/or a higher UL data start symbol index may be set than when the same BW part index as the UL grant reception BW part index is indicated), and/or the A/N transmission delay (candidate set) and/or the PUCCH transmission symbol position (candidate set) may be configured differently according to the indicated BW part index for PUCCH transmission.

Figure 18:
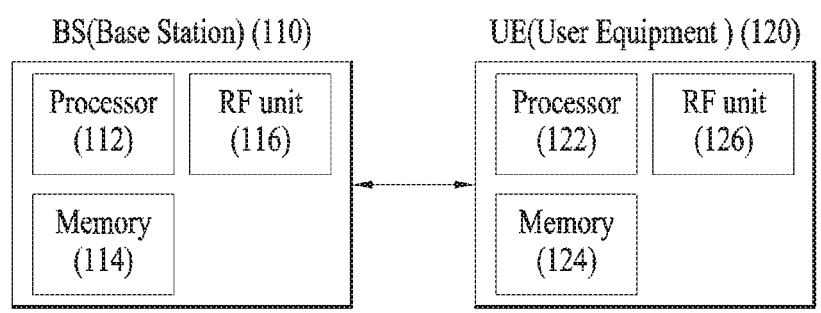
FIG. 18 illustrates a base station and a user equipment applicable to an embodiment of the present invention.

FIG. 18 illustrates a BS and a UE of a wireless communication system, which are applicable to embodiments of the present invention.

Referring to FIG. 18, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

What is claimed is:

1. A method for transmitting a signal by a terminal in a wireless communication system, the method comprising:
   configuring a plurality of acknowledgement/negative acknowledgment (A/N) transmission delays and a plurality of physical uplink control channel (PUCCH) resource sets through a higher layer signal, wherein each of the PUCCH resource sets corresponds to a respective A/N transmission delay;
   receiving downlink scheduling information indicating a first A/N transmission delay among the plurality of A/N transmission delays;
   receiving data indicated by the downlink scheduling information; and
   transmitting an A/N for the data using a PUCCH resource at a time determined according to the first A/N transmission delay,
   wherein a PUCCH resource set is selected from the plurality of PUCCH resource sets based on the first A/N transmission delay, and
   wherein the PUCCH resource is selected from the PUCCH resource set based on (an index of a control channel element (CCE) used for reception of the downlink scheduling information) mod K, wherein K is a number of elements in the PUCCH resource set, and A mod B denotes a remainder obtained by dividing A by B.

2. The method according to claim 1, wherein the plurality of A/N transmission delays is independently configured for each Hybrid Automatic Repeat Request (HARQ) process ID.

3. A terminal used in a wireless communication system, the terminal comprising:
   a radio frequency (RF) transceiver; and
   a processor,
   wherein the processor is configured to:
   configure a plurality of acknowledgment/negative acknowledgment (A/N) transmission delays and a plurality of physical uplink control channel (PUCCH) resource sets through a higher layer signal, wherein each of the PUCCH resource sets corresponds to a respective A/N transmission delay;
   receive downlink scheduling information indicating a first A/N transmission delay among the plurality of A/N transmission delays;
   receive data indicated by the downlink scheduling information; and
   transmit an A/N for the data using a PUCCH resource at a time determined according to the first A/N transmission delay,
   wherein a PUCCH resource set is selected from the plurality of PUCCH resource sets based on the first A/N transmission delay, and
   wherein the PUCCH resource is selected from the PUCCH resource set based on (an index of a control channel element (CCE) used for reception of the downlink scheduling information) mod K, wherein K is a number of elements in the PUCCH resource set, and A mod B denotes a remainder obtained by dividing A by B.

4. The terminal according to claim 3, wherein the plurality of A/N transmission delays is independently configured for each Hybrid Automatic Repeat Request (HARQ) process ID.

* * * * *